(12) United States Patent
Huang et al.

(10) Patent No.: US 11,662,822 B1
(45) Date of Patent: May 30, 2023

(54) SYSTEMS AND METHODS FOR GENERATING PSEUDO HAPTIC FEEDBACK

(71) Applicants: Da Yuan Huang, Markham (CA); Wei Li, Markham (CA); Pourang Polad Irani, Winnipeg (CA); Alice Jing Fei Liang, Toronto (CA); Yukun Zhang, Oakville (CA); Qing Liu, Waterloo (CA)

(72) Inventors: Da Yuan Huang, Markham (CA); Wei Li, Markham (CA); Pourang Polad Irani, Winnipeg (CA); Alice Jing Fei Liang, Toronto (CA); Yukun Zhang, Oakville (CA); Qing Liu, Waterloo (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/555,880

(22) Filed: Dec. 20, 2021

(51) Int. Cl.
*G06F 3/01* (2006.01)
*G06F 3/04883* (2022.01)
*G06F 3/041* (2006.01)

(52) U.S. Cl.
CPC .............. *G06F 3/016* (2013.01); *G06F 3/017* (2013.01); *G06F 3/041* (2013.01); *G06F 3/04883* (2013.01); *G06F 2203/04105* (2013.01)

(58) Field of Classification Search
None
See application file for complete search history.

(56) References Cited

U.S. PATENT DOCUMENTS

| | | | | |
|---|---|---|---|---|
| 2013/0332892 | A1* | 12/2013 | Matsuki | G06F 3/04842 715/863 |
| 2014/0306891 | A1* | 10/2014 | Latta | G06F 3/011 345/158 |
| 2015/0227210 | A1* | 8/2015 | Chen | G06F 3/0346 345/156 |
| 2015/0268725 | A1* | 9/2015 | Levesque | G06F 3/041 345/156 |
| 2018/0074694 | A1 | 3/2018 | Lehmann et al. | |
| 2019/0121500 | A1* | 4/2019 | Liddell | G06F 3/048 |
| 2020/0097077 | A1* | 3/2020 | Nguyen | G06F 3/04842 |

OTHER PUBLICATIONS

M. Samad, E. Gatti, A. Hermes, H. Benko and C. Parise, "Pseudo-Haptic Weight: Changing the Perceived Weight of Virtual Objects By Manipulating Control-Display Ratio," in ACM CHI Conference on Human Factors in Computing Systems, Glasgow 2019.

(Continued)

*Primary Examiner* — Krishna P Neupane

(57) ABSTRACT

Systems and methods for generating pseudo haptic feedback for a virtual widget are disclosed. The method includes computing, from a force profile of the virtual widget, a virtual displacement value based on a force value and a type of the virtual widget. The force profile describes a user's perception of physical characteristics of the virtual widget. The method generates a visual haptic feedback based on the virtual displacement value and the type of the virtual widget. Further, in response to the force value, the method may display on a display screen the visual haptic feedback.

20 Claims, 12 Drawing Sheets

- In slope phase, the intensity of the button (i.e., the displacement) changes according to the measured finger force.

- A fast animation of intensity changes is displayed for the jump phase.

- A static image or an animation is displayed for the bottom out phase.

(56) References Cited

OTHER PUBLICATIONS

S. Kim and G. Lee, "Haptic Feedback Design for a Virtual Button Along Force-Displacement Curves," in ACM Symposium on User Interface Software and Technology (UIST), St. Andrews 2013.

K.-C. Liao, S. Kim, B. Lee and A. Oulasvirta, "Button Simulation and Design via FDW Models," in ACM CHI Conference on Human Factors in Computing Systems, Honolulu 2020.

S. Heo, J. Lee and D. Wigdor, "PseudoBend: Producing Haptic Illusions of Stretching, Bending, and Twisting Using Grain Vibrations," in ACM Symposium on User Interface Software and Technology (UIST), New Orleans 2019.

* cited by examiner

SYSTEMS AND METHODS FOR GENERATING PSEUDO HAPTIC FEEDBACK

FIELD

The present application generally relates to touchscreen and virtual reality (VR) devices and, more specifically, to methods and systems for generating pseudo or visual haptic feedback response to user input received on touchscreen or VR devices.

BACKGROUND

Over the past few years, there has been increasing research and commercial interest in developing touchscreen and virtual reality (VR) devices. Virtual widgets are key components used to design and implement graphical user interfaces in 2D and 3D applications. Such virtual widgets may include various types such as buttons, sliders, and rotary knobs.

However, these virtual widgets lack the natural haptic feedback of their physical counterparts, and users cannot feel the physical characteristics of the widgets, such as texture or friction. When a user manipulates a physical widget, these characteristics can generate a distinctive sensation back to the user. Some of the sensations caused by the physical characteristics of a physical widget may form a force profile for the widget.

Existing systems may use haptic hardware to enhance virtual widgets and simulate the force profile of physical widgets in the virtual world. However, haptic feedback, such as vibrotactile feedback, generally requires expensive and complex hardware.

Prior works have demonstrated the ability of pseudo haptics to alter a user's perception of an object's physical properties, such as the work in M. Samad, E. Gatti, A. Hermes, H. Benko and C. Parise, "*Pseudo-Haptic Weight: Changing the Perceived Weight of Virtual Objects by Manipulating Control-Display Ratio*," in ACM CHI Conference on Human Factors in Computing Systems, Glasgow, 2019, the entire content of which is herein incorporated by reference. While the prior work demonstrated the impact of pseudo haptic feedback, it did not explore virtual widgets, force profiles, or physical widgets simulation.

There is a need for systems and methods that generate pseudo haptic feedback for virtual widgets.

SUMMARY

According to one aspect of the present disclosure, a method for generating pseudo haptic feedback for a virtual widget is discussed. The method may include: computing, from a force profile of the virtual widget, a virtual displacement value based on a force value and a type of the virtual widget; generating visual haptic feedback based on the virtual displacement value and the type of the virtual widget; and causing to display the visual haptic feedback on a display screen in response to the force value. The force profile describes a user's perception of physical characteristics of the virtual widget.

An alternative technique to haptic mechanisms is using pseudo haptic feedback, or more specifically, visual haptic feedback. Pseudo haptics is a form of haptic illusion that considers the cross-modal effect between the visual and haptic systems. The combination of an exerted force or a movement by the user and visual haptic feedback causes a haptic sensation to be perceived by the user. As the haptic sensation is generated using visual feedback, pseudo haptic solutions are lightweight and do not require complex hardware.

The disclosed embodiments provide a virtual widget system that delivers realistic haptic feedback sensations using only visual effects on a display screen, the visual effects being simulated based on a set of characteristics included in a force profile of a virtual widget. The disclosed embodiments provide a lightweight method and system for generating visual haptic feedback for virtual widgets in both 2D and 3D applications.

In some embodiments, the method may further include, prior to computing the virtual displacement value: receiving a user input associated with the virtual widget; determining the type of the virtual widget; and computing the force value based on the user input.

In some embodiments, the user input is detected by one or more sensors and may include one of a press motion, a release motion, a swipe motion, or a rotation motion.

In some embodiments, the user input may include a press or release motion on a touch-sensitive device, and computing the force value may include computing the force value based on a force amount of the press or release motion detected by the one or more sensors.

In some embodiments, the user input may include a swipe motion on a touch-sensitive device; and computing the force value may include computing the force value based on a distance of the swipe motion.

In some embodiments, the user input is a hand gesture detected by a virtual reality (VR) sensor system; and computing the force value may include computing the force value based on a displacement associated with the hand gesture detected by the VR sensor system.

In some embodiments, the type of the virtual widget may include a Graphical User Interface (GUI) element from a button, a slider, or a rotary knob.

In some embodiments, prior to computing the virtual displacement value, the method may include: retrieving a set of displacement values corresponding to a set of force values for the type of the virtual widget.

In some embodiments, the set of displacement values may include values in at least one of: a jump phase, a slope phase, and a bottom out phase.

In some embodiments, the method may further include: determining that the virtual displacement value is in the jump phase, the slope phase, or the bottom out phase; and generating the visual haptic feedback based on the phase of the virtual displacement value.

In some embodiments, the virtual displacement value is in the jump phase, and the visual haptic feedback comprises an animation for the jump phase for the type of the virtual widget.

In some embodiments, the animation for the jump phase includes a change of intensity of color for the virtual widget.

According to another aspect of the present disclosure, there is provided a system for generating pseudo haptic feedback for a virtual widget, the system includes: a processing unit; and a memory coupled to the processing unit, the memory storing machine-executable instructions that, when executed by the processing unit, cause the system to: compute, from a force profile of the virtual widget, a virtual displacement value based on a force value and a type of a virtual widget; generate a visual haptic feedback based on the virtual displacement value and the type of the virtual widget; and cause to display the visual haptic feedback on a display screen in response to the force value. The force profile describes a user's perception of physical characteristics of the virtual widget.

In some embodiments, the instructions, when executed by the processing unit, may cause the system to, prior to computing the virtual displacement value: receive a user input associated with the virtual widget; determine the type of the virtual widget; and compute the force value based on the user input.

In some embodiments, the user input is detected by one or more sensors and may include one of: a press motion, a release motion, a swipe motion, or a rotation motion.

In some embodiments, the user input may include a press or release motion on a touch-sensitive device, and computing the force value may include computing the force value based on a force amount of the press or release motion detected by the one or more sensors.

In some embodiments, the user input may include a swipe motion on a touch-sensitive device; and computing the force value may include computing the force value based on a distance of the swipe motion.

In some embodiments, the user input is a hand gesture detected by a virtual reality (VR) sensor system; and computing the force value may include computing the force value based on a displacement associated with the hand gesture detected by the VR sensor system.

In some embodiments, the type of the virtual widget may include a Graphical User Interface (GUI) element from a button, a slider, or a rotary knob.

In some embodiments, computing the virtual displacement value may include: retrieving a set of displacement values corresponding to a set of force values for the type of the virtual widget.

In some embodiments, the set of displacement values may include values in at least one of a jump phase, a slope phase, and a bottom out phase.

In some embodiments, the instructions, when executed by the processing unit, may cause the system to: determine that the virtual displacement value is in the jump phase, the slope phase or the bottom out phase; and generate the visual haptic feedback based on the phase of the virtual displacement value.

In some embodiments, the virtual displacement value is in the jump phase, and the visual haptic feedback comprises an animation for the jump phase for the type of the virtual widget.

In some embodiments, the animation for the jump phase includes a change of intensity of color for the virtual widget.

According to another aspect of the present disclosure, there is provide a non-transitory computer-readable medium storing instructions which, when executed by a processor, cause the processor to: receive a user input associated with a virtual widget; determine a type of the virtual widget; compute a force value based on the user input; compute a virtual displacement value based on the force value and the type of the virtual widget; generate a visual haptic feedback based on the virtual displacement value and the type of the virtual widget; and cause to display the visual haptic feedback on a display screen in response to the force value.

Other aspects and features of the present disclosure will become apparent to those of ordinary skill in the art upon review of the following description of specific implementations of the disclosure in conjunction with the accompanying figures.

BRIEF DESCRIPTION OF THE DRAWINGS

Reference will now be made, by way of example, to the accompanying drawings which show example implementations; and in which.

DETAILED DESCRIPTION

The disclosed embodiments provide a virtual widget system that delivers realistic haptic feedback sensations using visual effects on a display screen, the visual effects being simulated based on a set of characteristics included in a force profile of a virtual widget. A force profile may include force and displacement data with values obtained from a physical widget. The data from a force profile may be used to generate visual presentations of a virtual widget responsive to receiving a given user input, such as a user hand gesture.

Throughout the disclosure, a virtual widget may refer to any type of Graphical User Interface (GUI) elements that can receive a user input and can respond to the received user input, such as through pseudo haptic feedback. A virtual widget may resemble a widget in the physical world, such as a keyboard key, a mouse button, a sliding bar or a slider, a rotary knob, an icon, and so on. The visual haptic feedback for a virtual widget may be generated based on force and displacement data collected for a corresponding physical widget.

A force profile can effectively describe a user's perception of the key characteristics of physical widgets such as buttons. In prior works, vibrotactile feedback generated using force profiles was shown to be able to mimic the haptic effect of interacting with a physical button, such as described in S. Kim and G. Lee, "H*aptic Feedback Design for a Virtual Button Along Force-Displacement Curves,*" in ACM Symposium on User Interface Software and Technology (UIST), St. Andrews, 2013, the entire content of which is herein incorporated by reference. S. Kim and G. Lee determined that users were able to distinguish between different force-displacement graphs through vibrotactile feedback alone and then match those simulated virtual buttons to their corresponding physical buttons. Furthermore, the force profiles collected from physical buttons provided more details and nuances than user-generated profiles, allowing for a richer and more distinctive haptic experience.

For ease of illustration, force and displacement data from force profiles may be used to populate a corresponding force-displacement graph or a displacement-force graph. In general, force-displacement graphs can be split into two curves or phases: a "press" curve, which captures the behavior of a physical widget when the physical widget is being displaced from its initial position to its displaced or "bottom out" position where it has received a maximum displacement, and a "release" curve, which captures the behavior of the physical widget when it is returned to its initial position without any displacement. Each of these force-displacement curves can be plotted based on a one-to-one function between a force value and its corresponding displacement value in a force-displacement graph.

Figure 1:
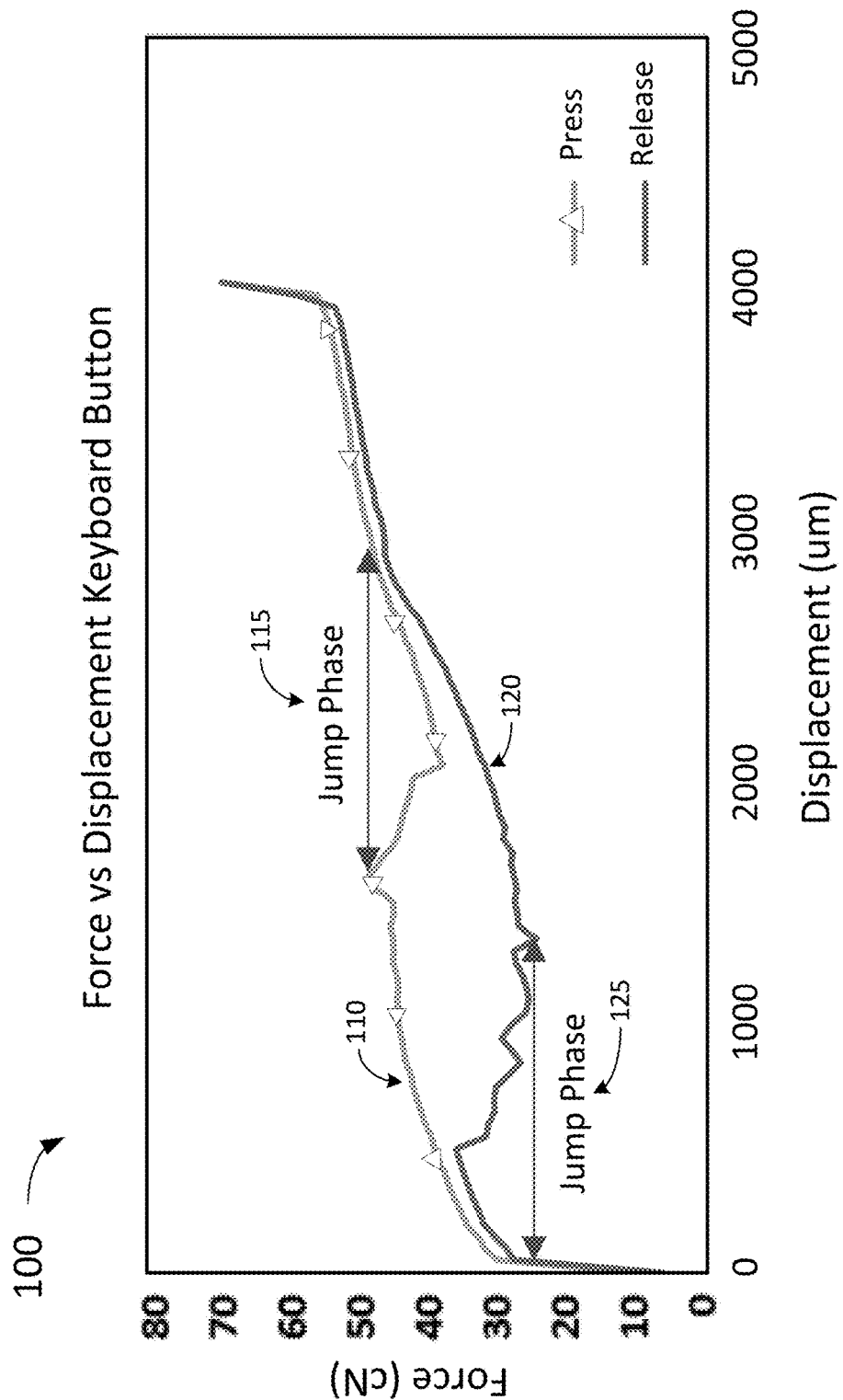
FIG. 1 illustrates an example force-displacement graph for a keyboard button.

FIG. 1 illustrates a force-displacement graph 100 for a keyboard button, which plots a set of force values applied to a physical widget (e.g., a keyboard button in this graph) against corresponding displacements of the physical widget. For each respective force value in centinewton (cN), there is shown a corresponding displacement of the physical widget in micrometer (i.e., μm or um) at each of two curves: the engaging (or press) curve 110 and the disengaging (or release) curve 120 of during user interaction with the physical widget. The engaging or press curve 110 is plotted based on data collected from when the user applies a force against the keyboard button, causing the button to sink beneath its original position. In contrast, the disengaging or release curve 120 is plotted based on data collected from when the user releases the keyboard button, such that the button moves back up to its original position.

The press curve 110 and the release curve 120 may each include three phases, a slope phase, a jump phase, and a bottom out phase, each phase describing a specific section of the press curve 110 or the release curve 120. The jump phase is discussed below, and the slope and the bottom out phases are discussed further below in FIG. 3.

Figure 2:
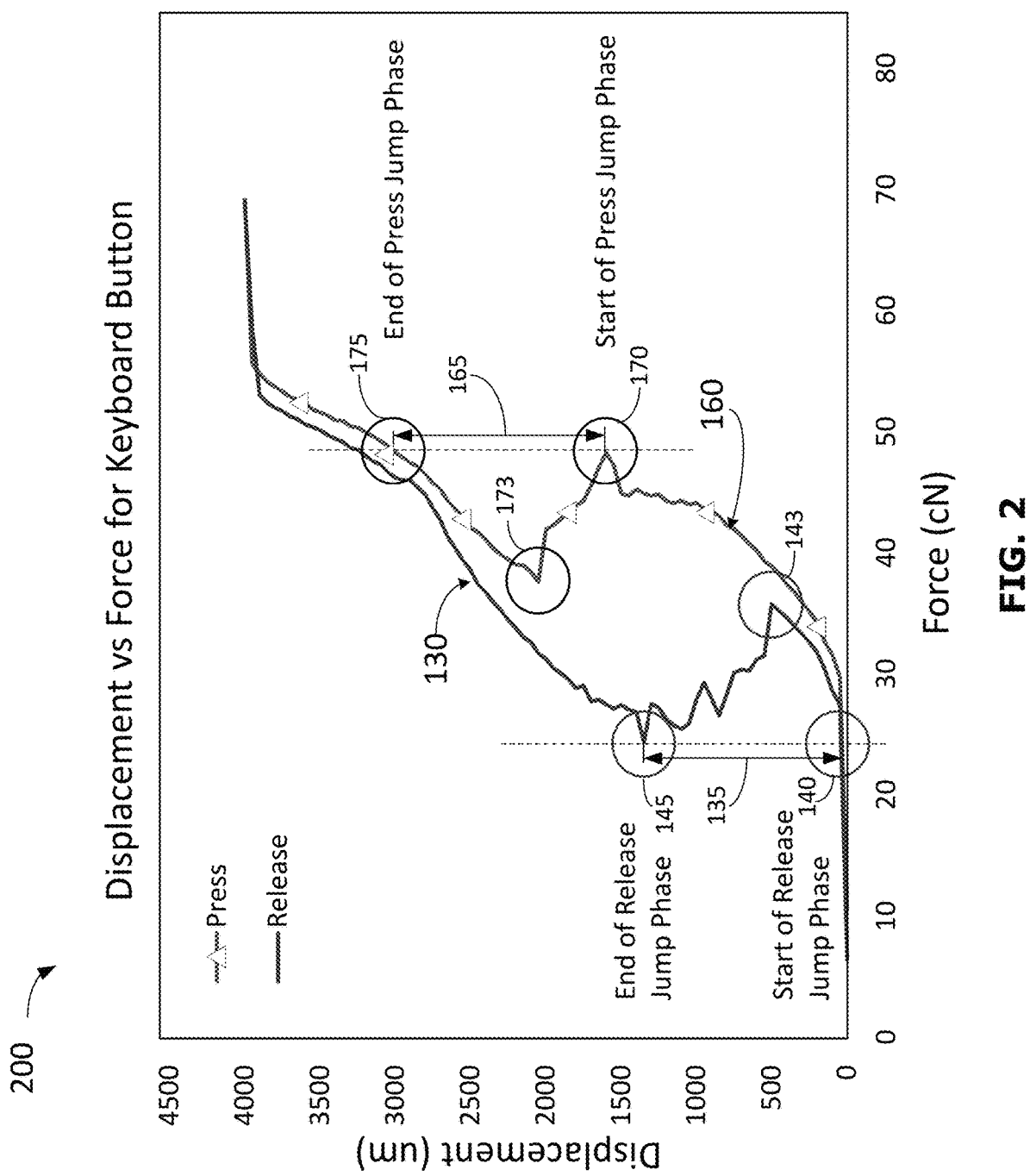
FIG. 2 illustrates an example displacement-force graph for a keyboard button.

During the press curve 110, there is a respective jump phase 115 in the force-displacement graph 100. Similarly, during the release curve 120, there is a respective jump phase 125 in the force-displacement graph 100. For a keyboard button, jump phases 115, 125 are phases corresponding to when a user feels the "click" sensation when a user physically interacts with the button. While each jump phase 115, 125 illustrates a one-to-one function between the force value and its corresponding displacement value in the force-displacement graph 100, it is not a one-to-one function in the displacement-force graphs, as shown in FIG. 2 below. It is a one-to-one function for force-displacement 100 such that for each displacement value, there is a corresponding force value, one force value in specific. Therefore, there is 1-to-1 mapping which allows for a unique visual presentation. If it is not a 1-to-1 mapping, a displacement value may correspond to more than one force value; hence, no unique visual presentation can be generated.

FIG. 2 illustrates an example displacement-force graph 200 for a keyboard button. As can be seen, the press curve 160 and the release curve 130 displacement-force graph 200 are generally not one-to-one functions in a sense that some force values may correspond to more than one displacement values on the graph. In addition, during the jump phases 135, 165 of the release and press curves 130, 160, respectively, the displacement of the widget (e.g., keyboard button) generally increases despite a decrease in the force applied in the displacement-force graph 200. Such an increase in displacement means that after the start of the jump phase 140, 170, the displacement of the widget increases. Once a respective force threshold 143, 173 is reached, the displacement of the widget will continue through to the end 145, 175 of the jump phase of the displacement-force curve 135, 165 unless the force applied drops below the minimum force for the press curve 160 or the maximum force for the release curve 130 in respective jump phases of the displacement-force curve 135, 165.

Prior works have demonstrated that the displacement-force curves of a physical button can vary depending on the velocity the button is pressed at, as such, the duration of the jump phase 135, 165 in this model is variable and dependent on the rate of change of the user's input prior to entering the jump phase of the displacement-force curve 135, 165. While the keyboard button physical widget has been used as an example, curves may be obtained from other physical widget types like rotary knobs and sliding bars. For example, each of the tables below includes selected force and displacement data for a given type of widget.

TABLE 1

Force Displacement Data for Button Widget

| | | Force Start (cN) | Displacement Start (um) | Force End (cN) | Displacement End (um) |
|---|---|---|---|---|---|
| Press Phase | Slope | 21 | 0 | 58 | 1020 |
| | Jump | 59 | 1040 | 59 | 2680 |
| | Slope | 60 | 2700 | 104 | 3980 |
| | Bottom Out | 106 | 4000 | | |
| Release Phase | Bottom Out | 106 | 4000 | | |
| | Slope | 97 | 3980 | 19 | 1880 |
| | Jump | 18 | 1860 | 15 | 60 |
| | Slope | 9 | 40 | 8 | 0 |

TABLE 2

Force Displacement Data for Keyboard Key Widget

| | | Force Start (cN) | Displacement Start (um) | Force End (cN) | Displacement End (um) |
|---|---|---|---|---|---|
| Press Phase | Slope | 0 | 0 | 68 | 580 |
| | Jump | 68 | 600 | 69 | 1460 |
| | Slope | 72 | 1480 | 230 | 1980 |
| | Bottom Out | 245 | 2000 | N/A | N/A |
| Release Phase | Bottom Out | 245 | 2000 | N/A | N/A |
| | Slope | 233 | 1980 | 26 | 1000 |
| | Jump | 26 | 980 | 26 | 260 |
| | Slope | 23 | 240 | 0 | 0 |

Figure 3:
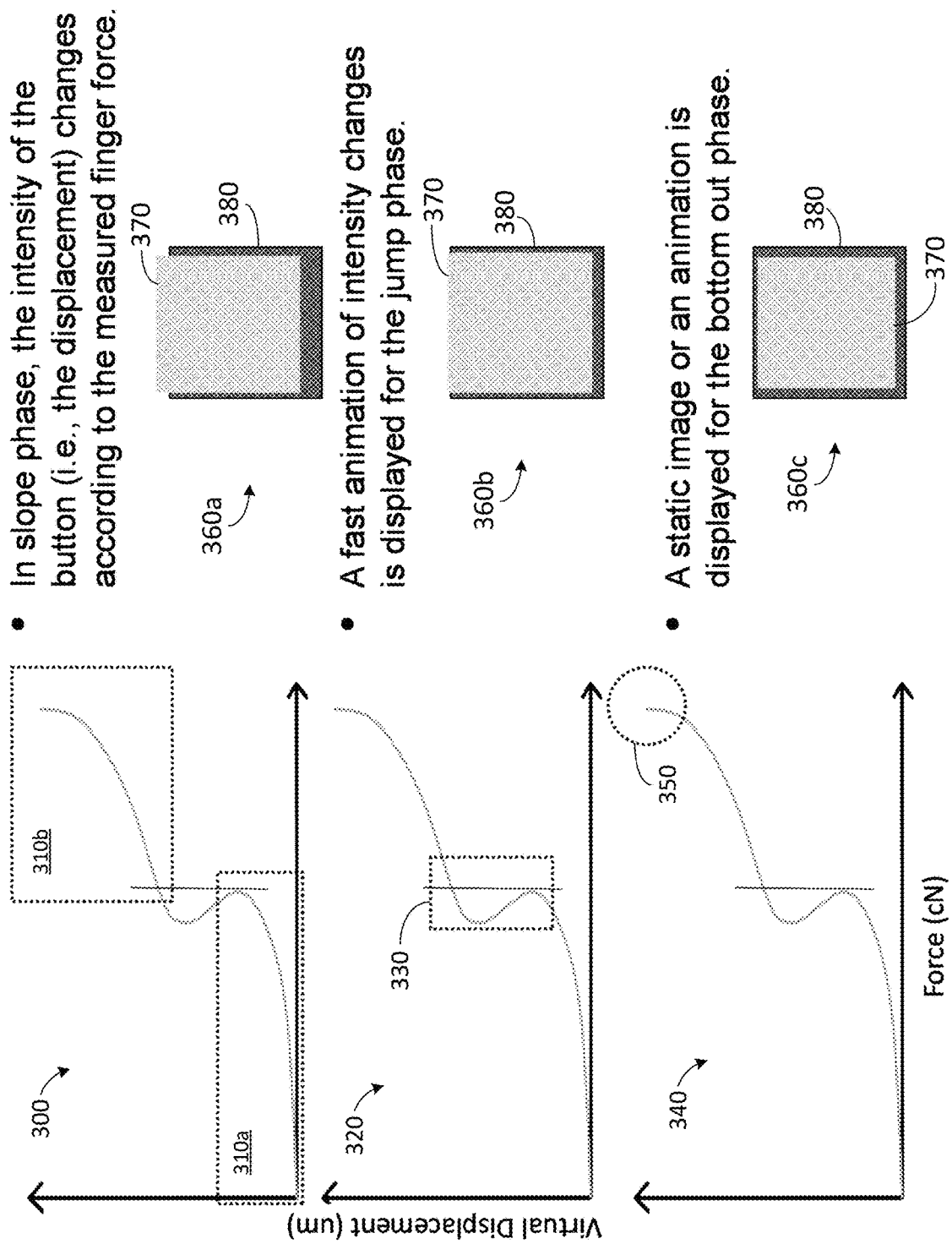
FIG. 3 illustrates example animations for a button widget in different phases

FIG. 3 illustrates example animations for a virtual button widget in different phases. In some embodiments, changing the visual presentation of the widget in accordance with the force profile allows the virtual widget to simulate the haptic effect of a physical widget. Visual characteristics such as the intensity, size, C/D ratio of movement, and other factors can be implemented to generate a visual presentation. For example, the visual presentation of a button can be generated in real-time or near real-time based on a given force profile of the button. The force profile may include data representing the change in force in terms of cN per frame or per millisecond, such as data included in the table below.

| Frame Rate: 250 f/s | | | |
|---|---|---|---|
| Change in Force (cN/frame) | Change in Force (cN/ms) | Frames | Duration (ms) |
| 50 | 12.5 | 5 | 20 |
| 100 | 25 | 4 | 16 |
| 150 | 37.5 | 3 | 12 |
| 200 | 50 | 2 | 8 |
| 200+ | 50+ | 1 | 4 |

The visual presentation may be represented on a screen by spanning multiple frames. The screen may have a fixed framerate. Therefore, the visual presentation can be presented only if the animation duration is greater than 1/framerate seconds. It is clearer to a person skilled in the art to address the visual presentation in duration rather than the number of frames.

It is to be understood that the above table is an example and not a limitation. Using the above table for a stronger press (i.e. the ones requiring a larger change in force per frame) requires a smaller number of frames, hence, shorter visual presentation. The above example table was selected as a prototype for a keyboard button. Thus, it may need to be modified for other physical widgets that need to be visually presented.

FIG. 1 and FIG. 2 illustrated the force and the displacement values collected from a physical widget, in other words, a force profile of a physical widget, which may be used for the visual presentation of a virtual widget to simulate pseudo haptic feedback. When a user input associated with the virtual button widget is received, a force value is computed using sensors associated with the virtual button widget. The force value is mapped to a virtual displacement value. The virtual displacement value may be the respective displacement value of the force value in the force profile. The virtual displacement value is used in the visual presentation of the virtual widget.

The press curve 300, shown in FIG. 3, illustrates a virtual displacement-force graph for a press curve. The curve is generated using the force profile of a respective physical button widget. Curve sections 310a and 310b represent the slope phases of the press curve 300. Graph 320 illustrates the jump phase 330 of the press curve, and graph 340 presents the bottom out phase of the press curve. Each phase may be visually presented as different intensity, movement, size, shape, opacity, shadow, and/or color. This example embodiment describes the virtual button widget 370 having a different location (i.e. movement visual characteristic) depending on the phase of the virtual button. For instance, the virtual button at stage 360a shows the virtual button widget 370 in the slope phase, 310a or 310b. When the input force detects the onset of the jump phase 330, the location of the virtual button changes to be as in stage 360b. When the bottom out phase starts, which is described as when the respective physical widget button is fully pressed in the press curve, the virtual button location changes to the designated location of the bottom out phase 350 as in stage 360c.

The shadow presentation 380 of the virtual presentation, which is optional, may enhance the pseudo haptic feedback and create stronger pressing sensations for the user. Just like any other part of the visual presentation, the shadow's 380 size, color, shape, etc. may be changed. Further, the shadow may have a visual presentation that changes over time.

It is to be understood the above example embodiment described the movement visual characteristic for the visual presentation of a button widget being pressed. Other visual characteristics may be similarly implemented and for various virtual widgets, such as a rotary knob or a slider.

Figure 4:
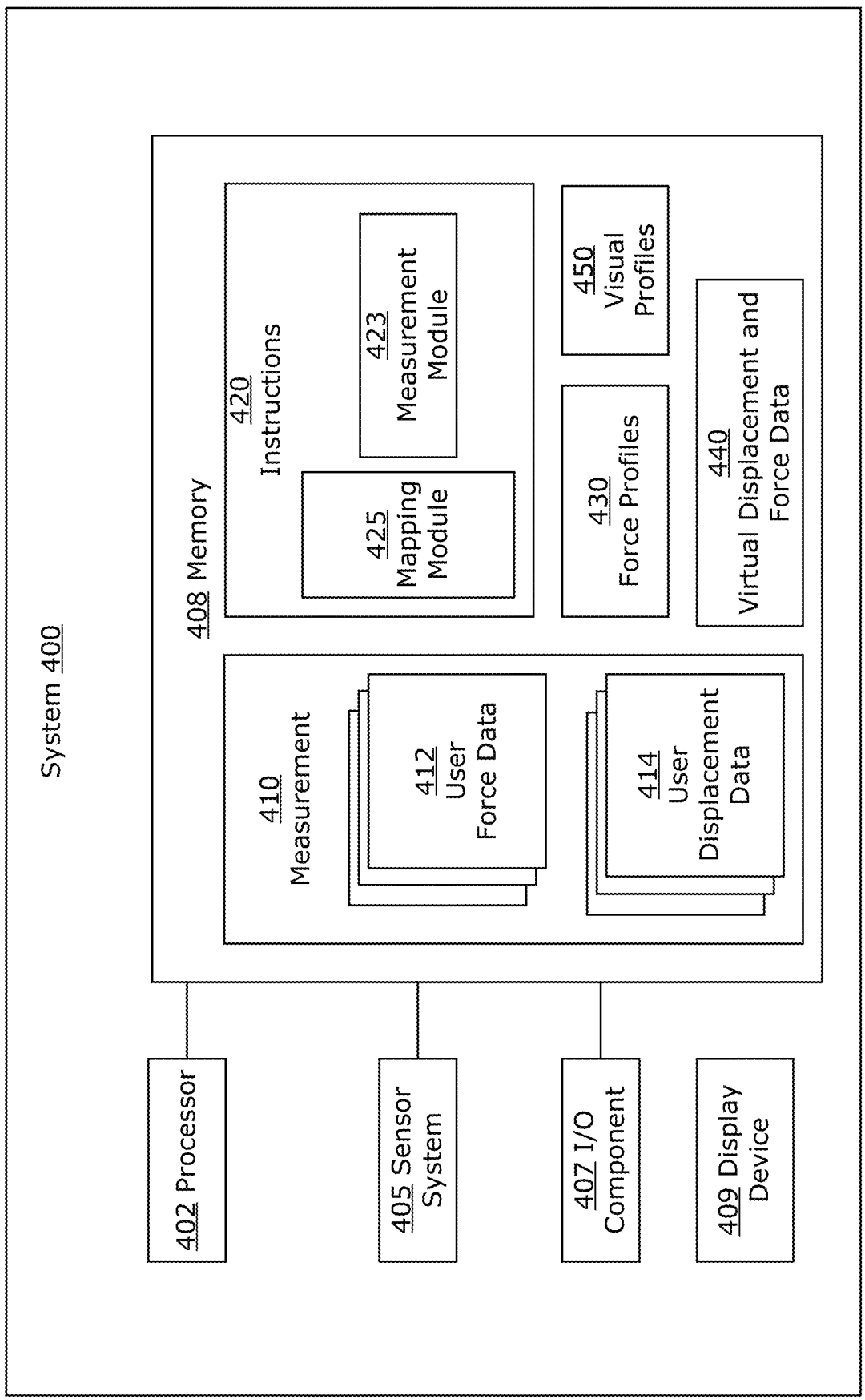
FIG. 4 illustrates an example system for generating visual haptic feedback for a user input, in accordance with some example embodiments.

FIG. 4 illustrates a system 400 for generating visual haptic feedback based on a user input, in accordance with some example embodiments. The visual haptic feedback is the visual presentation of a virtual displacement value of a force value of the user input. Although an example embodiment of the system 400 is shown and discussed below, other embodiments may be used to implement examples disclosed herein, which may include components different from those shown. Although FIG. 4 shows a single instance of each component of the system 400, there may be multiple instances of each component shown.

The system 400 includes one or more processors 402, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 402 may collectively be referred to as a "processor device" or "processor 402".

The system 400 includes one or more memories 408 (collectively referred to as "memory 408"), which may include a volatile or non-volatile memory (e.g., a flash memory, a random access memory (RAM), and/or a read-only memory (ROM)). The memory 408 may store machine-executable instructions for execution by the processor 402. A set of machine-executable instructions 420 is shown stored in the memory 408, which may be executed by the processor 402 to perform the steps of the methods for generating visual haptic feedback based on a user input described herein. The memory 408 may include other machine-executable instructions for execution by the processor 402, such as machine-executable instructions for implementing an operating system and other applications or functions.

In some examples, the system 400 may also include one or more electronic storage units (not shown), such as a solid-state drive, a hard disk drive, a magnetic disk drive and/or an optical disk drive. In some examples, one or more datasets and/or modules may be provided by an external memory (e.g., an external drive in wired or wireless communication with the system 400) or may be provided by a transitory or non-transitory computer-readable medium. Examples of non-transitory computer-readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 408 to implement data storage, retrieval, and caching functions of the system 400.

The components of the system 400 may communicate with each other via a bus, for example. In some embodiments, the system 400 is a distributed computing system and may include multiple computing devices in communication with each other over a network, as well as optionally one or more additional components. The various operations described herein may be performed by different computing devices of a distributed system in some embodiments. In some embodiments, the system 400 is a virtual machine provided by a cloud computing platform.

The memory 408 stores one or more sets of measurement data 410. The measurement data 410 includes a plurality of user force data 412, and one or more user displacement data 414 as described below. The memory 408 may further store force profiles 430, virtual displacement and force data 440, and visual profiles 450.

The instructions 420 may include a measurement module 423 and a mapping module 425.

The measurement module 423 may be configured to receive user input from a sensor system 405 and/or an I/O component 407. The I/O component 407 may be linked to or include a display device 409. In some embodiments, the measurement module 423 can, through a display device 409, detect and track the movement of a user's finger (or a stylus) received via display device 409 to determine user input parameters such as the number of touches, direction, force value, velocity, and duration of touches. These input parameters can be used to recognize and determine a type of input gesture. For example, one or more motion sensors on the display device 409 can measure acceleration forces and rotational forces along the X-Y-Z axes of the display device 409 (which may be, for example, force-sensitive touch display 505 in FIG. 5). The motion sensor(s) may include accelerometers, gravity sensors, gyroscopes, or rotational vector sensors.

The measurement module 423 receives the user input data and store them in measurement data 410. The user force data 412, which includes force values, is the force exerted by the user and captured by the sensor system 405 or the I/O component 407 through the measurement module 423. Example embodiments describe the user force data as force values captured when a user pushes a virtual button on the display device 409. The user displacement data 414, which includes displacement values, is the displacement moved by a virtual button captured by the sensor system 405 or the I/O component 407 through the measurement module 423. User displacement data may be collected when a user slides a slider widget on a display device 409.

The force profiles 430 in the system 400 is a module that includes force profiles for various physical widgets such as a button, a slider, a rotary knob, etc. Each force profile includes force values exerted by a user on a physical widget and the respective displacement values moved by the physical widget. When a user input is measured as force, the mapping module 425 uses the force profiles 430 to compute a corresponding virtual displacement value and store it in virtual displacement and force data 440. The virtual displacement value is the displacement value of the force value in the force profiles 430. The mapping module 425 also computes and assigns the phase to the virtual displacement values, the phase being slope, jump, or bottom out. After computing the virtual displacement and force data 440, the visual profiles 450 represents the virtual displacement values of the virtual displacements into respective visual characteristics such as intensity, movement, etc., for visual presentation. The visual profiles 450 may visually present the virtual displacement values based on the phase assigned to the displacement values in the virtual displacement and force data 440 by the mapping module 425.

The mapping module 425 determines the phases for the virtual displacement values. The mapping module 425 may determine the jump phase using a piecewise continuous function Example embodiment may implement the piecewise continuous function as $$y = \begin{cases} 2x & \text{if } 0 < x \leq 2 \\ 4 & \text{if } x > 2 \end{cases},$$

where x is the rate of change and y is the duration of the jump phase. It is to be understood that the aforementioned piecewise continuous function is just an example and not meant to be a limitation. This concept of the piecewise continuous function is explained below.

Referring to FIG. 2, each onset of the jump phase 140, 170 is determined based on the rate of change of the user input. The rate of change may be the change of force values within a predefined interval (e.g. $0 < x \leq 2$). The onset of the jump phase 140, 170 may be determined when the rate of change surpasses a predefined jump phase threshold (e.g. $x > 2$). A designer may determine the predefined interval and the predefined jump phase threshold. The slope phases correspond to the regions in the release curve 130 and press curve 160 where there is a one-to-one mapping between the force value and displacement value. The bottom-out phase corresponds to the value of maximum force value and maximum displacement value.

The jump phase spans displacement from the onset of the jump phase to the end of the jump phase 135, 165, which is also referred to jump phase distance. After computing the jump phase displacements, the visual profiles 450 computes the respective visual presentation based on visual characteristics, i.e., intensity, size, position, etc., for the jump phase. In example embodiments, the jump phase distance may be presented as a static presentation, for example, a single intensity value, size, position, etc., for the entire jump phase distance. In example embodiments, the jump phase may be presented as a dynamic intensity, size, or position. For the dynamic presentation, the visual profiles 450 divides the jump phase distance by the number of frames, and a visual presentation for the virtual widget is assigned for each frame.

Example embodiments may implement a dynamic presentation for intensity. In such a scenario, the visual profiles 450 assigns an intensity value for the slope phases, another intensity value for the bottom out phase, and a plurality of intensity values for the jump phase. The number of the plurality of intensity values depends on the phase jump distance and the number of frames required to represent the jump phase distance. For instance, if the phase jump distance spans 5 frames, the visual profiles 450 may assign 5 intensity values to present the phase jump. It is to be understood that a similar method is performed when the visual presentation is for visual characteristics of position, size, shadow, etc.

Example embodiments may implement a static presentation for intensity. In such a scenario, the visual profiles 450 assigns an intensity value for the slope phases, another intensity value for the bottom out phase, and an intensity value for the jump phase.

Figure 5:
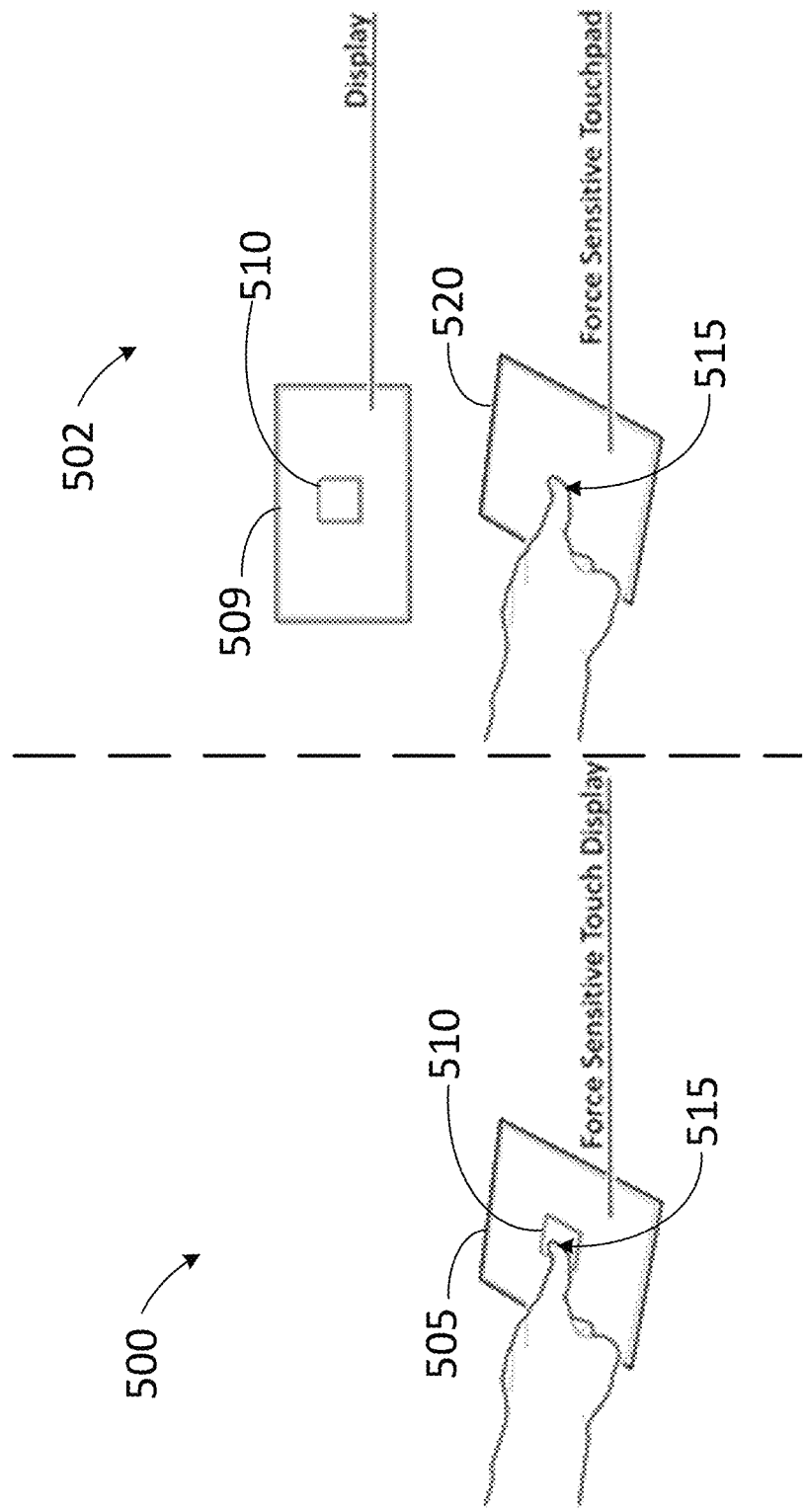
FIG. 5 illustrates example touch-sensitive devices used to receive user input for generating visual haptic feedback.

FIG. 5 shows two schematic diagrams 500 and 502 for generating visual presentation for a virtual button widget being pressed. Schematic diagram 500 is for a force-sensitive touch display 505 receiving user input 515. The virtual button widget is displayed on the force-sensitive touch display 505. The force-sensitive 505 may have one or more pressure sensors integrated into the display screen to measure a force exerted by a user's fingertip (or a stylus) 515 on a surface of the display screen, for example, at a virtual widget 510. The measurement module 423 may, based on a measurement received from the pressure sensor, determine a force exerted by a user's fingertip (or stylus) on the display screen of the force-sensitive touch display 505.

In a similar manner to schematic diagram 500, schematic diagram 502 shows a force-sensitive touchpad 520 that may not display the virtual button widget on the touchpad. Instead, the virtual widget 510 is displayed on a touchpad display 509.

It is to be understood that example embodiments may describe the force-sensitive touch display 505, force-sensitive touchpad 520, and display 509 as a component of the I/O component 407. Also, the force-sensitive touch display 505 and touchpad display 509 may be display device 409.

The measurement module 423 of system 400 in FIG. 4, associated with the force-sensitive touch display 505 and the force-sensitive touchpad 520, receives the force data exerted by fingertip (or stylus) 515 and store the data as user force data 412. The mapping module 425 uses the force profiles 430 to compute respective virtual displacement values, which are mapped for visual presentation using the visual profiles 450. An example of visual presentation changes includes changing the virtual button widget's visual characteristics, such as the intensity, position, size, etc.

The sensors mentioned above can be integrated into the body of the display device 409, 505; for example, the sensors may be part of the glass or part of the plastic or metal that overlays on top of the glass of the display screen of the display device 409, 505.

Figure 6:
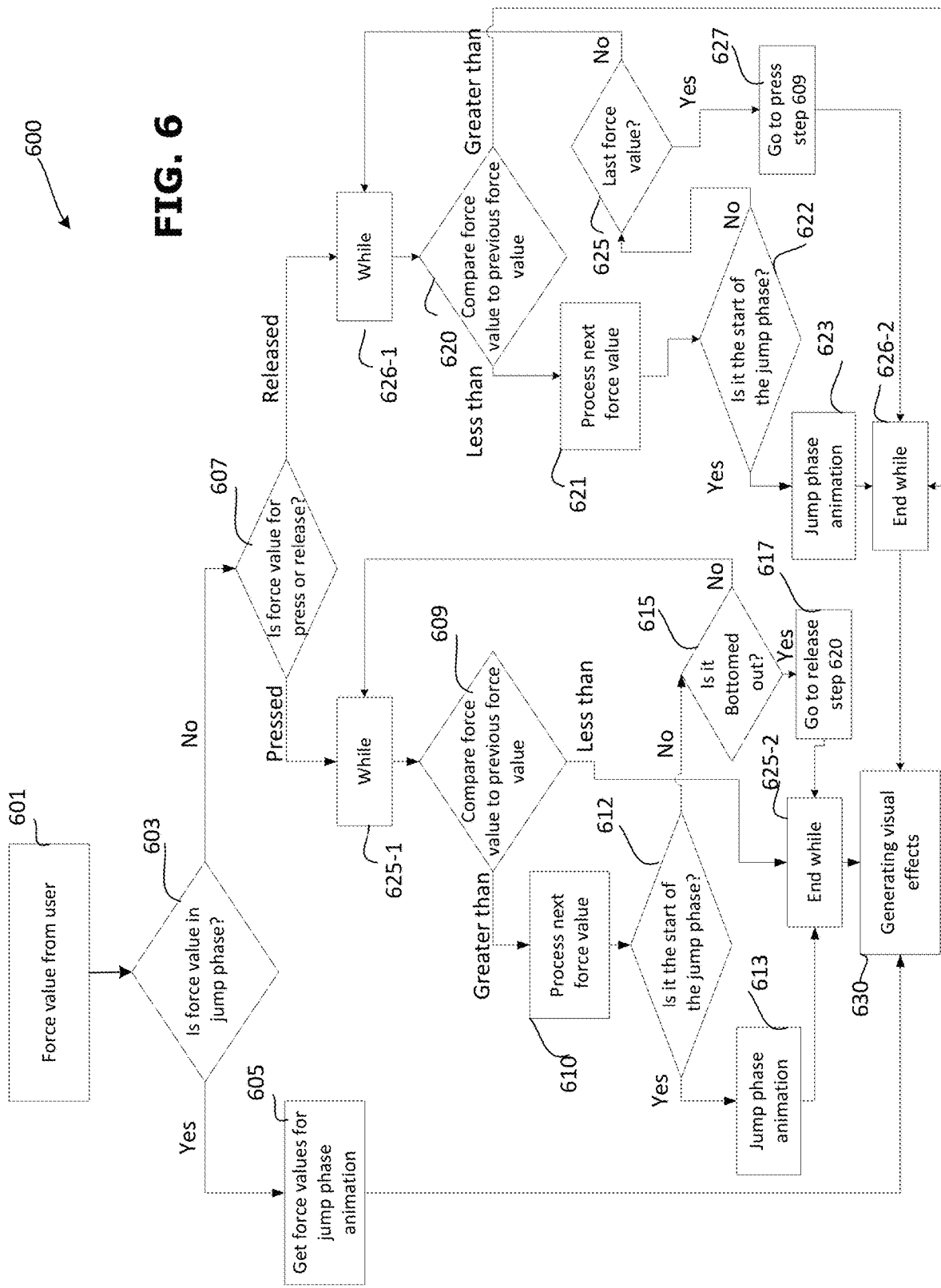
FIG. 6 illustrates a flowchart for an example process to generate visual haptic feedback, in accordance with some example embodiments.

FIG. 6 illustrates a flowchart for an example process 600 to generate visual haptic feedback, i.e. via visual presentation, in accordance with some example embodiments. FIG. 6 describes measuring a force value at step 601 by the measurement module 423 and storing the force value as user force data 412. As described above, the force value is determined whether it is in a jump phase using one of the methods: discrete, continuous, or the combination of the discrete and continuous methods. Proceeding to step 603, if the process determines the force value is in the jump phase, the process 600, at step 605, collects all the force values within the jump phase for visual presentation then proceeds to step 630. The process at step 605 involves mapping the force values within the jump phase into virtual displacement values in the mapping module 425. The process 600 then proceeds to step 630, at which the force values within the jump phase are visually presented in the visual profiles 450.

If the process 600 at step 603 determines that the force value received at step 601 is not in the jump phase, subsequent steps of the process 600 depend on whether the process is for a press or a release curve. If the process 600 at step 607 determines that the force value is for a press curve, then a while loop 625-1 starts, which involves one or more steps of 609, 610, 612, 612, 615, and 617. At step 609, the process 600 compares the force value, which is the currently received force value, to the previous force value. If the force value (i.e., the current force value) is less than the previous force value, the while loop 625-1 ends at step 625-2. If the while loop 625-1 is ended, the process 600 proceeds to step 630 for visual presentation. However, if the process 600 at step 609 determines that the force value is greater than the previous force value, the process 600 proceeds to step 610. At step 610, the process receives the next force value in the measurement module 423 then proceeds to step 612. At step 612, the process 600 determines whether the next force value is the start of a jump phase using one of the methods described above, including the discrete, continuous, or combination. If the next force value is within a jump phase, then the process 600 proceeds to step 613, at which the process 600 collects all force values within the jump phase for visual presentation. The process 600 then ends, at step 625-2, the while loop 625-1. The process 600 proceeds to generating visual effects at step 630 in response to ending the while loop 625-2.

If the process at step 612 determines that the next force value is not within a jump phase, the process 600 proceeds to step 615. At step 615, the process 600 determines whether the next force value is in a bottom out phase as explained above. If the process 600 determines that the next force value is in a bottom out phase, the process 600 proceeds to step 617. At step 617, the process 600 marks the end of the press curve, at which the while loop 625-1 ends (step 625-2), and the process 600 proceeds to step 620. However, if the next force value is not in the bottom out phase at step 615, the process 600 continues the while loop 625-1.

The while loop 626-1 for the release curve starts at step 620, where the process 600 compares the force value to the previous force value. If the process determines the force value is greater than the previous value, the while loop 626-1 ends at step 626-2. If the while loop 626-1 is ended, the process 600 proceeds to step 630 for visual presentation. However, if the process 600 at step 620 determines that the force value is less than the previous force value, the process 600 proceeds to step 621. At step 621, the process receives the next force value using the measurement module 423 then proceeds to step 622. At step 622, the process 600 determines whether the next force is the start of a jump phase using one of the methods described above, including the discrete, continuous, or combination. If the next force value is the start of a jump phase, then the process 600 proceeds to step 623, at which the process 600 collects all the force values within the jump phase for visual presentation. The process 600 then ends, at step 626-2, the while loop 626-1 and proceeds to step 630 for visual presentation.

If the process at step 622 determines that the next force value is not within a jump phase, the process 600 proceeds to step 625. At step 625, if the process 600 determines that the next force value is the last force value, the process 600 proceeds to step 627. At step 627, the process 600 marks the end of the release curve at which the while loop 626-1 ends at step 626-2 and process proceeds to step 609. However, if the next force value is not in the last force value, the process 600 continues through the while loop 626-1.

Figure 7:
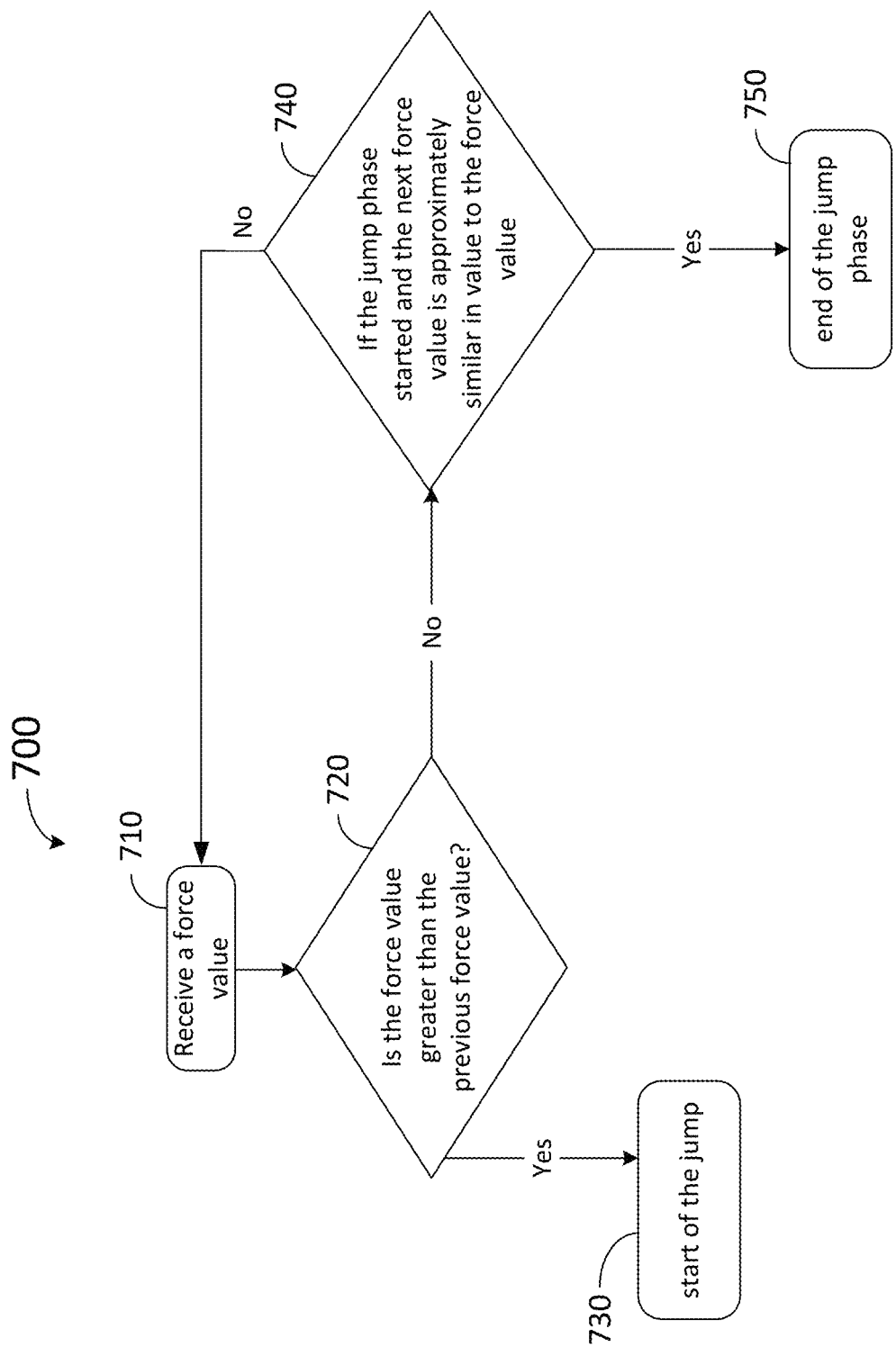
FIG. 7 illustrates a flowchart for an example process to label a force value into a jump phase in a release phase, in accordance with some example embodiments.

FIG. 7 illustrates a flowchart for an example process 700 to label a force value into a jump phase in a release phase, in accordance with some example embodiments. The measurement module 423 detects through the sensor system 405 or the I/O component 407 when a user exerts a force towards a virtual widget. The measured force is stored as user force data 412 as a force value at step 710. At step 720, the mapping module 425 compares the force value to the previous force value. If the force value is greater than the previous force value, then the mapping module 425 marks the start of the jump phase.

If the force value is not greater than the previous force value, the mapping module 425 proceeds to step 740. At step 740, if a jump phase has started at step 730 and if the force value is within a pre-specified threshold of the previous force value, the mapping module 425 performs step 750, marking the jump phase's ending. At step 740, if a jump phase has not started at step 730 or if the force value is not within a pre-specified threshold of the previous force value, the process 700 proceeds to step 710 to receive another force value.

Figure 8:
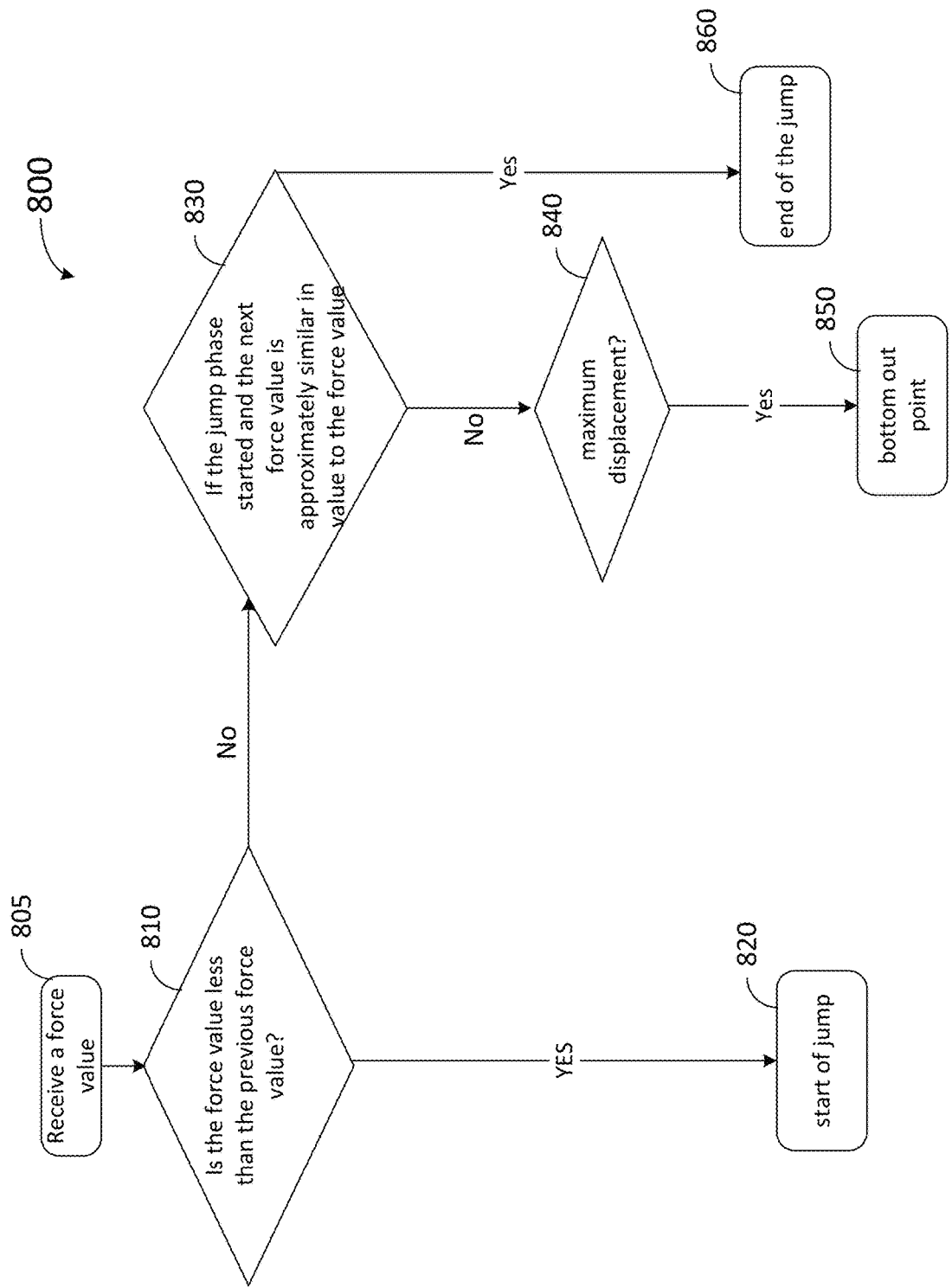
FIG. 8 illustrates a flowchart for an example process to label a force value into a jump phase in a press curve, in accordance with some example embodiments.

FIG. 8 illustrates a flowchart for a process 800 to label a force value into a jump phase in a press curve, in accordance with some example embodiments. The measurement module 423 detects through the sensor system 405 or the I/O component 407 when a user exerts a force towards a virtual widget. The measured force is stored as user force data 412 as a force value at step 805. At step 810, the mapping module 425 compares the force value received at step 805 to the previous force value. If the force value is less than the previous force value, then the mapping module 425 marks the starting of the jump phase for the press curve.

If the force value is not less than the previous force value, the mapping module 425 proceeds to step 830. At step 830, if a jump phase has started previously at step 820 and if the force value is within a pre-specified threshold of the previous force value, the mapping module 425 performs step 860, which marks the ending of the jump phase. Further, if the force value is not within the pre-specified threshold of the previous force value, the mapping module 425 performs step 840, in which the mapping module 425 determines if the maximum displacement is reached from the force profile. If the maximum displacement is reached, the mapping module 425 performs step 850, in which the mapping module 425 assigned a bottom-out phase for the current force value; otherwise, the visual presentation for the bottom-out phase is not rendered.

Figure 9B:
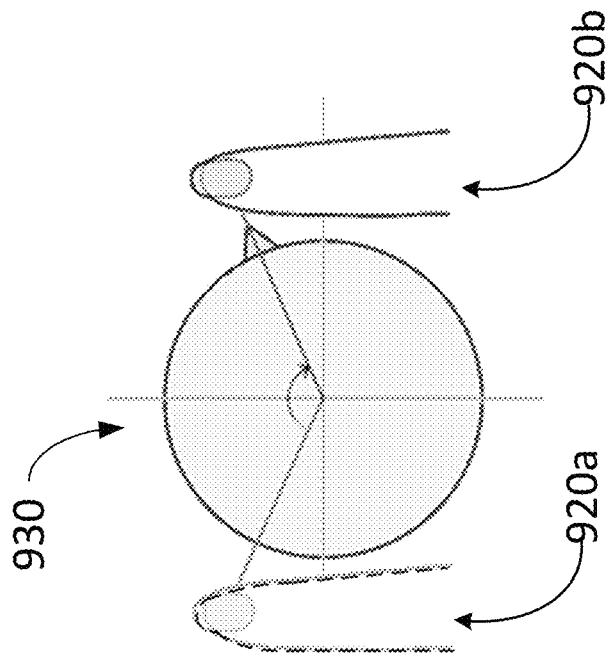
FIG. 9B illustrates an example rotatory knob widget being controlled by a user input.
Figure 9A:
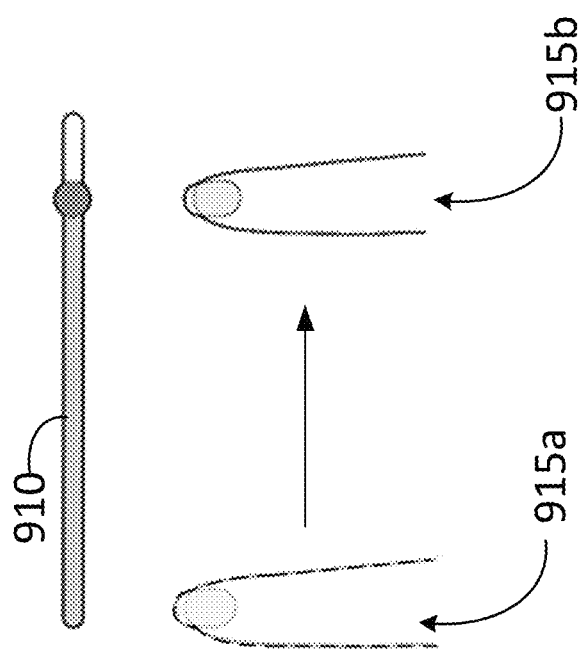
FIG. 9A illustrates an example slider widget being controlled by a user input.

FIG. 9A illustrates an example virtual slider widget being controlled by a user input. The virtual slider widget 910 is controlled by a user fingertip (or styles, or the like) from position 915a to position 915b. Similarly, FIG. 9B illustrates an example rotary knob widget 930 controlled by a user input. The virtual rotary knob is controlled by a user finger (or the like) from position 920a to position to position 920b. Unlike the example embodiments described above for the virtual button widget where force is measured, in the scenarios of FIG. 9A and FIG. 9B, the displacement is measured. In both of FIG. 9A and FIG. 9B, the direction of motion of the user input is parallel to the sensing sensor (i.e., force-sensitive touch display 505, force-sensitive touchpad 520, etc.). In such example embodiments, the measurement module 423 measures displacement rather than force. Hence, the measurement module 423 stores the displacement values in the user displacement data 414. The mapping module 425 maps each displacement value to a virtual force value then uses the force profiles 430 to generate the respective virtual displacement value. The virtual displacement value is then represented as visual presentation using the visual profiles 450.

To compute the virtual force value from a displacement value, the mapping module 425 first extracts the component of the motion in the direction of the motion of the user input. For the example embodiment of FIG. 9A, the component of the motion is parallel to the displacement of moving the virtual slider widget. For the example embodiment of FIG. 9B, the component of the motion is the angle of the displacement motion to rotate the rotary knob.

In reference to FIG. 9A, where the virtual slider widget is horizontal, the displacement value used for computing the virtual force value is displacement in the x-axis component of the user input. In another example embodiment, if the virtual slider is vertical, then the y-axis component of the user input is extracted and is considered the displacement value used for computing the respective virtual force value. In reference to FIG. 9B, where the virtual widget is a rotary knob, the displacement is the displacement angle θ. The displacement angle may be determined by computing the angle between the initial position providing the user input (e.g., the initial position of the fingertip or stylus) and the final position providing the user input (e.g., the final position of the fingertip or stylus after rotating the rotary knob). The displacement angle θ may be computed as follows:

$$\theta = \cos^{-1}\left(\frac{v_i \cdot v_f}{\|v_i\|\|v_f\|}\right) \quad (1)$$

where $v_i$ is a vector originated at the center of the rotary knob and in the direction of the initial position, $v_f$ is a vector originated at the center of the rotary knob and in the direction of the final position.

The mapping module 425 maps the displacement value from a virtual slider widget to a virtual force value as follows:

$$\text{virtual force} = \frac{M_f}{S_L} \times \text{displacement value} \quad (2)$$

where $M_f$ is the maximum force value of the respective physical widget, $S_L$ is the virtual slider length, and displacement value is the motion component parallel to the virtual slider widget. $M_f$ and $S_L$ are predefined and set by the designer.

Similarly, the virtual force value for a virtual rotary knob can be computed as follows:

$$\text{virtual force} = \frac{M_f}{\theta_M} \times \text{displacement value} \quad (3)$$

where $M_f$ is the maximum force value of the respective physical widget, $\theta_m$ is the maximum virtual rotary knob displacement angle, and displacement value is the displacement angle θ. $M_f$ and $\theta_m$ are predefined and set by the designer.

It is appreciated that a person skilled in the art would understand that the displacement value for a rotary knob is the angle of rotation and the displacement value for a slider is the displacement magnitude.

Figure 10A:
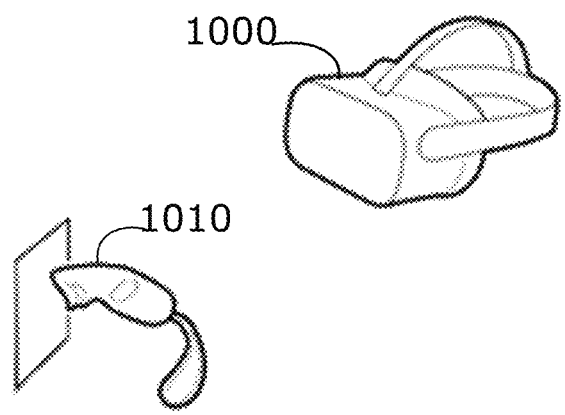
FIG. 10A illustrates an example VR system used to receive a user input for generating visual haptic feedback.
Figure 10B:
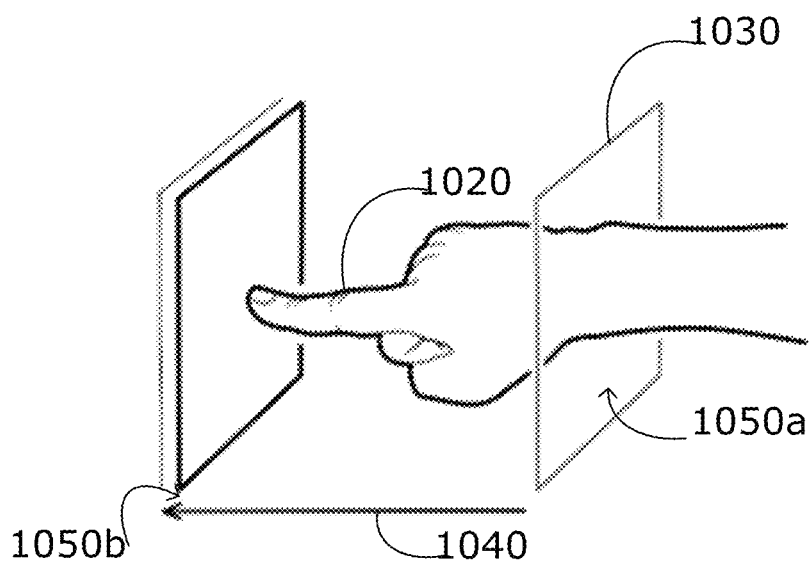
FIG. 10B illustrates example user input received by another example VR system for generating visual haptic feedback.

FIG. 10A illustrates an example virtual reality (VR) system that may be used to receive user input for generating visual haptic feedback. Example embodiments of VR systems may use a VR headset and a VR controller 1010. The headset 1000 and the VR controller 1010 enable users to look around a virtual space simulating the virtual environment as if the user is in the virtual environment. FIG. 10B illustrates an example user input received by another example VR system for generating visual haptic feedback. In FIG. 10B, a hand-tracker system instead of a controller. The hand tracker tracks a hand 1020 pushing a virtual button widget 1030 a displacement 1040 from a first location 1050a to a second location 1050b.

Example embodiment in FIG. 10B measures displacement rather than force, similar to the virtual slider widget and the virtual rotary knob widget. The measurement module 423 receives the user input as a displacement value and stores the value as user displacement data 414. The displacement value is mapped by the mapping module 425 into a virtual force value, which is further mapped into a virtual displacement. The virtual displacement value is used by the visual profiles 450 to visually present the virtual displacement value and generate visual haptic feedback.

Figure 11:
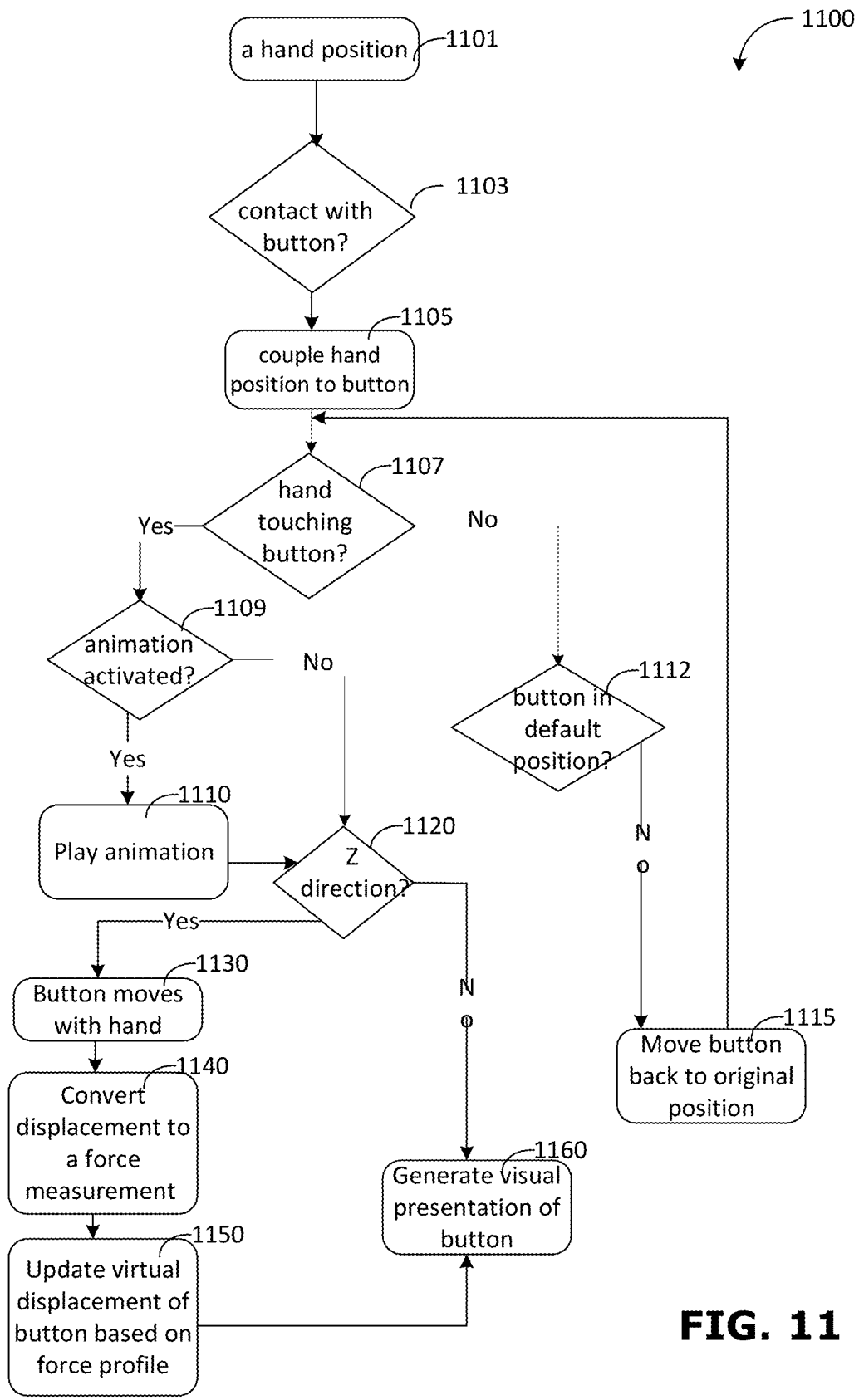
FIG. 11 illustrates a flow chart for an example method to process user input received by a VR system for generating visual haptic feedback, in accordance with some example embodiments.

FIG. 11 illustrates a flowchart of an example method 1100 to process user input received by a VR system for generating visual haptic feedback. The method 1100, through the measurement module 423, receives the virtual hand position and the physical hand position at step 1101. The method then proceeds to step 1103 at which the method 1100 determines if the virtual hand position is about to contact with a virtual button. At step 1103, the virtual hand position and physical hand position had moved the same distance. The method 1100 then proceeds at step 1105 to determine if the virtual hand is coupled with the virtual button. The method 1100 then proceeds to step 1107 to determine whether the virtual hand is touching the virtual button widget. In response to determining that the hand is touching the virtual button widget, the method 1100 determines if animation is activated at step 1109. If the virtual hand does not touch the virtual button at step 1107, then the button is in a default position at step 1112 and no visual presentation is to be performed. The method then proceeds to step 1115, at which the visual presentation of the virtual button is restarted to its original position. The method 1100 then waits until a virtual hand touches the virtual button at step 1107.

In response to determining that a virtual hand touches the virtual button at step 1107, then an animation that enhances pseudo haptic feedback may start at step 1109. For instance, an animation may include fingertip squishing or deforming when pressing on the surface of the virtual button. If the animation at step 1109 is activated, the animation starts at step 1110 then the method 1100 proceeds to steps 1120, 1130, 1140, 1150, and 1160 to generate a visual presentation. However, if the animation is not set to start at step 1109, the method 1100 directly proceeds to steps 1120, 1130, 1140, 1150, and 1160 to generate the visual presentation. Therefore, the method 1100 first proceeds to step 1120 to determine whether the movement direction is perpendicular to the surface of the virtual widget, i.e. in the z-direction or not. Perpendicular to the widget movement (z-direction) indicates pressing of a button virtual widget; however, a non-perpendicular movement indicates (i.e. x-direction or y-direction) indicates moving a virtual slider. In response to determining the direction of the movement is in the z-direction, the method 1100 proceeds to performing steps 1130, 1140, 1150, and 1160; otherwise, the method 1100 proceeds to performing step 1160 only.

In response to determining that the virtual hand is pressing or moving the virtual button at step 1130, the method 1100 proceeds to step 1140 at which the measured displacement value is converted to a virtual force value at step 1140. Further, the method 1100 proceeds to step 1150 where the virtual force value is converted to a virtual displacement value. Additionally, once the virtual displacement value is determined, the visual presentation for the virtual displacement is performed at step 1160.

Figure 12:
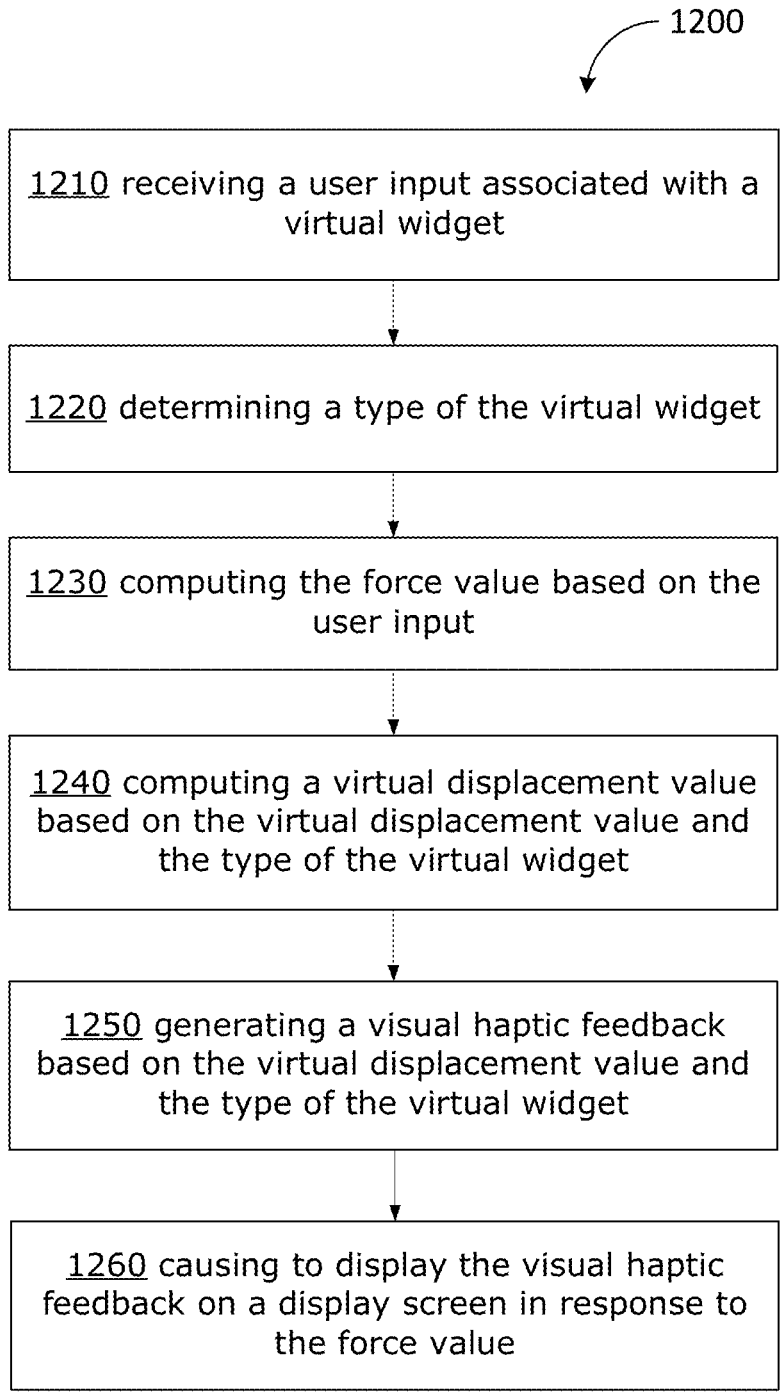
FIG. 12 illustrates a flowchart for an example method to receive a force value and generate visual haptic feedback based on the force value, in accordance with some example embodiments.

FIG. 12 illustrates a flowchart for an example method 1200 to receive a force value and generate visual haptic feedback based on a force value. The method 1200 starts at step 1210, at which the method 1200 receives a user input associated with a virtual widget. The method 1200 then proceeds to step 1220, at which the method 1200 determines the type of the widget, e.g. virtual button, virtual slider, virtual knob, etc. The method 1200 is for a virtual widget where the user input is a force. The method 1200 then proceeds to step 1230, at which the measurement module 423 computes a force value based on the user input and stores it in the user force data 412. At step 1240, the mapping module 425, using the force profiles 430 of the respective physical button widget, computes a virtual displacement value for the force value, storing the virtual displacement value in the virtual displacement and force data 440. Once, the virtual displacement value is computed, the method 1200 proceeds to step 1250. At step 1250, the visual profiles 450 generates a visual presentation based on the virtual displacement value, the visual presentation being the visual haptic feedback. The method 1200 then proceeds to step 1260. At step 1260, the method 1200 displays the visual haptic feedback on a display screen; this visual haptic feedback responds to the force value of the user input.

Although the present disclosure describes functions performed by certain components and physical entities, it should be understood that, in a distributed system, some or all of the processes may be distributed among multiple components and entities, and multiple instances of the processes may be carried out over the distributed system.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer-implemented method for generating pseudo haptic feedback for a virtual widget, comprising:
   computing, from a force profile of the virtual widget, a virtual displacement value for the virtual widget, based on a force value and a type of the virtual widget, wherein the force profile describes a user's perception of physical characteristics of the virtual widget;
   generating a pseudo haptic feedback based on the virtual displacement value, wherein the pseudo haptic feedback includes a visual feedback for generating a haptic sensation to be perceived by the user; and causing to display the visual pseudo haptic feedback on a display screen in response to the force value.

2. The method of claim 1, further comprising, prior to computing the virtual displacement value:
receiving a user input associated with the virtual widget;
determining the type of the virtual widget; and
computing the force value based on the user input.

3. The method of claim 2, wherein the user input is detected by one or more sensors and comprises one of: a press motion, a release motion, a swipe motion, or a rotation motion.

4. The method of claim 3, wherein:
the user input comprises a press or release motion on a touch-sensitive device; and
computing the force value comprises computing the force value based on a force amount of the press or release motion detected by the one or more sensors.

5. The method of claim 3, wherein:
the user input comprises a swipe motion on a touch-sensitive device; and
computing the force value comprises computing the force value based on a distance of the swipe motion.

6. The method of claim 3, wherein:
the user input is a hand gesture detected by a virtual reality (VR) sensor system; and
computing the force value comprises computing the force value based on a displacement associated with the hand gesture detected by the VR sensor system.

7. The method of claim 1, wherein the type of the virtual widget comprises a Graphical User Interface (GUI) element comprising one of: a button, a slider, or a rotary knob.

8. The method of claim 7, wherein computing the virtual displacement value comprises:
retrieving a set of displacement values corresponding to a set of force values for the type of the virtual widget.

9. The method of claim 8, wherein the set of displacement values comprise values in at least one of: a jump phase, a slope phase, and a bottom out phase.

10. The method of claim 9, comprising:
determining that the virtual displacement value is in the jump phase, the slope phase or the bottom out phase; and
generating the pseudo haptic feedback based on the phase of the virtual displacement value.

11. The method of claim 10, wherein the virtual displacement value is in the jump phase, and the pseudo haptic feedback comprises an animation for the jump phase for the type of the virtual widget.

12. The method of claim 11, wherein the animation for the jump phase comprises a change of intensity of color for the virtual widget.

13. A system for generating pseudo haptic feedback for a virtual widget, the system comprising:
a processing unit; and
a memory coupled to the processing unit, the memory storing machine-executable instructions that, when executed by the processing unit, cause the system to:

compute, from a force profile of the virtual widget, a virtual displacement value for the virtual widget, based on a force value and a type of the virtual widget, wherein the force profile describes a user's perception of physical characteristics of the virtual widget;
generate a pseudo haptic feedback based on the virtual displacement value, wherein the pseudo haptic feedback includes a visual feedback for generating a haptic sensation to be perceived by the user; and
cause to display the pseudo haptic feedback on a display screen in response to the force value.

14. The system of claim 13, wherein the instructions, when executed by the processing unit, cause the system to, prior to computing the virtual displacement value:
receive a user input associated with the virtual widget;
determine the type of the virtual widget; and
compute the force value based on the user input.

15. The system of claim 14, wherein the user input is detected by one or more sensors and comprises one of: a press motion, a release motion, a swipe motion, or a rotation motion.

16. The system of claim 15, wherein:
the user input comprises a press or release motion on a touch-sensitive device; and
computing the force value comprises computing the force value based on a force amount of the press or release motion detected by the one or more sensors.

17. The system of claim 15, wherein:
the user input comprises a swipe motion on a touch-sensitive device; and
computing the force value comprises computing the force value based on a distance of the swipe motion.

18. The system of claim 13, wherein the type of the virtual widget comprises a Graphical User Interface (GUI) element comprising one of: a button, a slider, or a rotary knob.

19. The system of claim 18, wherein computing the virtual displacement value comprises:
retrieving a set of displacement values corresponding to a set of force values for the type of the virtual widget.

20. A non-transitory computer-readable medium storing instructions which, when executed by a processor, cause the processor to:
receive a user input associated with a virtual widget;
determine a type of the virtual widget;
compute a force value based on the user input;
compute a virtual displacement value for the virtual widget based on the force value and the type of the virtual widget;
generate a pseudo haptic feedback based on the virtual displacement value, wherein the pseudo haptic feedback includes a visual feedback for generating a haptic sensation; and
cause to display the pseudo haptic feedback on a display screen in response to the force value.

* * * * *

UNITED STATES PATENT AND TRADEMARK OFFICE
CERTIFICATE OF CORRECTION

| | | |
|---|---|---|
| PATENT NO. | : 11,662,822 B1 | Page 1 of 1 |
| APPLICATION NO. | : 17/555880 | |
| DATED | : May 30, 2023 | |
| INVENTOR(S) | : Da-Yuan Huang et al. | |

It is certified that error appears in the above-identified patent and that said Letters Patent is hereby corrected as shown below:

In the Claims

In Column 17, Line 1 "causing to display the visual pseudo haptic feedback on a"
Should read --causing to display the pseudo haptic feedback on a--

Signed and Sealed this
Tenth Day of October, 2023

Katherine Kelly Vidal
*Director of the United States Patent and Trademark Office*